United States Patent [19]

Kren

[11] Patent Number: 5,414,906
[45] Date of Patent: May 16, 1995

[54] EYEGLASS STORAGE CLIP

[76] Inventor: Lawrence Kren, 4116 W. 214th St., Fairview Park, Ohio 44126

[21] Appl. No.: 162,861

[22] Filed: Dec. 6, 1993

[51] Int. Cl.⁶ ............................................. A44B 21/00
[52] U.S. Cl. ...................................... 24/3.3; 24/3.1; 24/11 S
[58] Field of Search .................. 24/3 C, 3 R, 3 J, 3 F, 24/11 S; 2/445; 224/251

[56] References Cited

U.S. PATENT DOCUMENTS

| | | | |
|---|---|---|---|
| 599,616 | 2/1898 | Lindley | 24/11 S |
| 1,779,015 | 10/1930 | Schmitt | |
| 1,787,830 | 0/1930 | Marvin | |
| 1,898,059 | 2/1933 | McDonald | |
| 1,973,648 | 9/1934 | Nagel | |
| 2,237,155 | 4/1941 | Malis | 24/11 S |
| 3,827,790 | 8/1974 | Wenzel | 24/3 C |
| 3,907,182 | 9/1975 | Bryant | 24/3 R |
| 4,894,887 | 1/1990 | Ward, II | 24/3 C |
| 4,903,375 | 2/1990 | DiFranco | 24/3 C |

Primary Examiner—Victor N. Sakran
Attorney, Agent, or Firm—Donald A. Bergquist

[57] ABSTRACT

A spring clip attaches to the temple bar of eyeglasses to engage a small fold of garment fabric or the fabric edge of a pocket for secure, temporary storage of the eyeglasses. By utilizing the forward-facing clamping jaws, those clamping jaws facing toward the eyeglass lenses, nearly coincident with the temple bar hinge, the moment arm between said jaws and said hinge is reduced substantially which prevents the eyeglasses from opening up when clipped on a garment outside of a pocket. By employing the rearward-facing clamping jaws, those clamping jaws facing toward the temple bar earpiece, the eyeglasses can be stored securely clipped in a pocket. To prevent snagging the wearer's hair, the spring clip has, as a feature of the best mode, fully enclosed actuating springs and no exposed sharp edges.

24 Claims, 2 Drawing Sheets

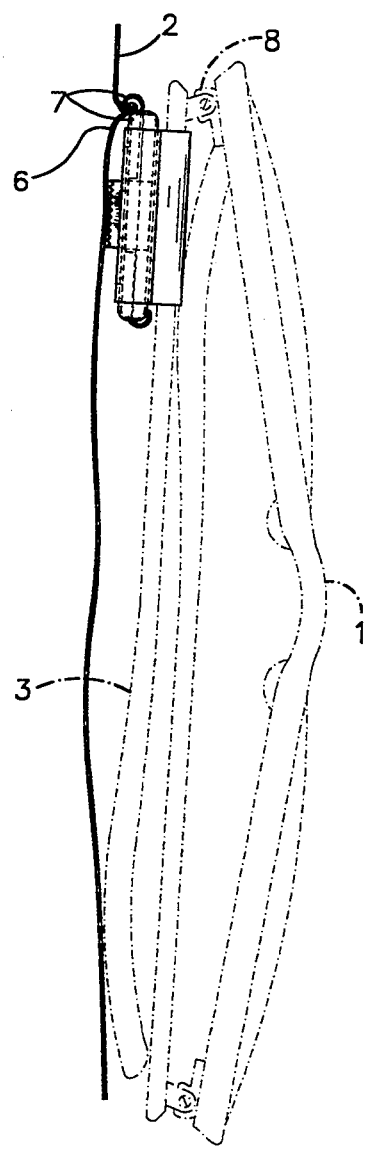
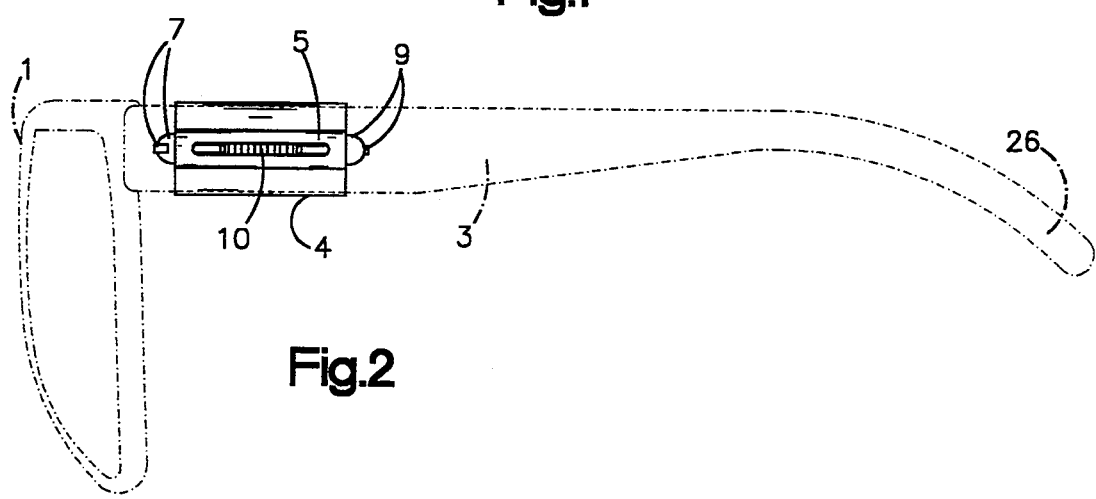

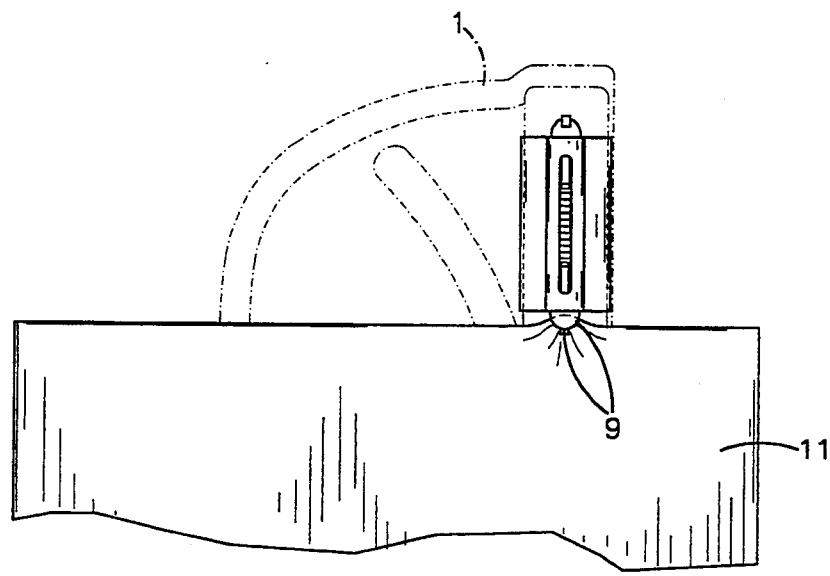
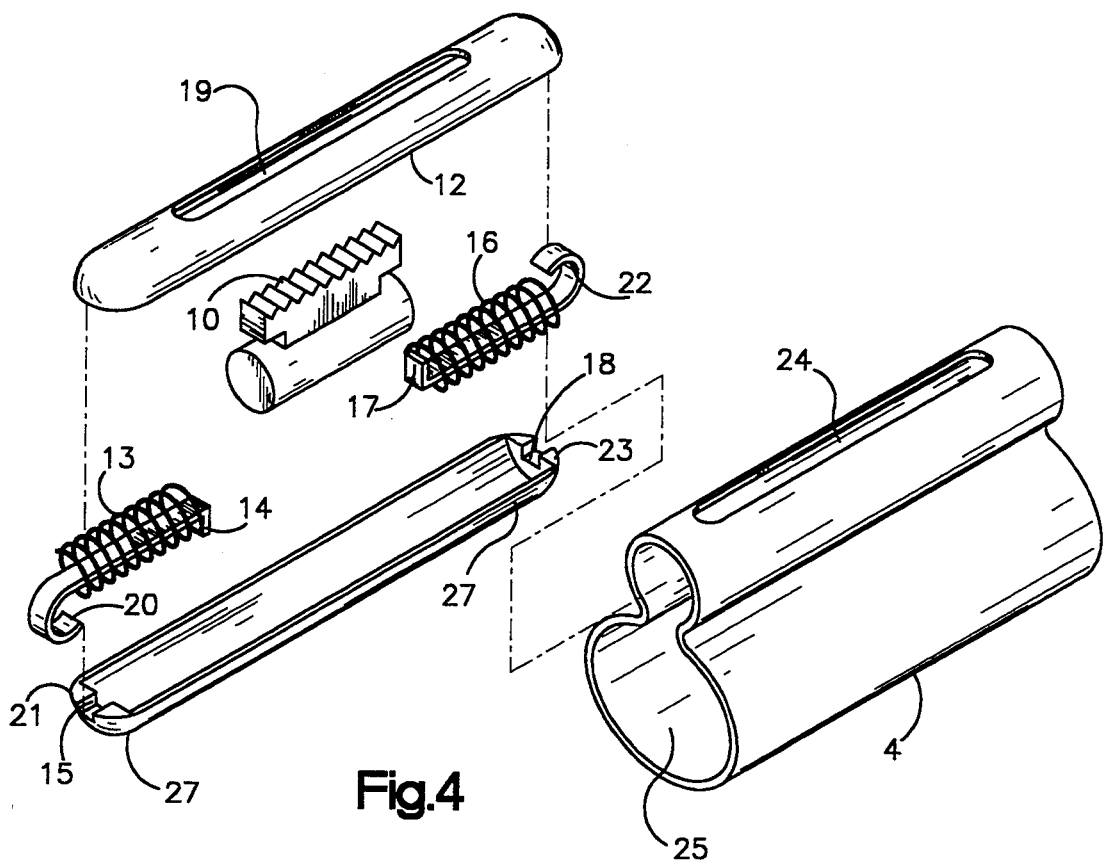

EYEGLASS STORAGE CLIP

FIELD OF INVENTION

This invention relates to eyeglasses, specifically to a clip that will permit the eyeglass wearer to securely store the eyeglasses, when not in use, in a pocket or anywhere on a garment.

DISCUSSION OF PRIOR ART

Temple bar clips are disclosed in U.S. Pat. No. 4,903,375, issued Feb. 27, 1990, to Di Franco; U.S. Pat. No. 1,973,648, issued Sep. 11, 1934, to Nagel; U.S. Pat. No. 1,898,059, issued Feb. 21, 1933 to McDonald; U.S. Pat. No. 1,787,830, issued Mar. 11, 1930, to Marvin; and U.S. Pat. No. 1,779,015, issued Oct. 21, 1930, to Schmitt. All of the above mentioned temple bar clips use a flat spring clip. The notable difference between them is the method by which the clip is attached to the eyeglass temple bar.

Schmitt uses rivets to attach the clip directly, an operation best performed during manufacture of the temple bar. Installation on an existing pair of eyeglasses requires tools and special skills. Once installed, the clip is not easily removable.

Nagel fixes a clip to a metal sheath member that applies spring force to a flexible tubular member that is inserted over the temple bar.

McDonald attaches a clip with a sleeve and set screw and Marvin uses an interference fit. The clips of McDonald, Marvin and Nagel are not practical today because of the variety of sizes and shapes of temple bars.

DiFranco attaches a plastic clip using O-rings of various sizes. Applicant believes DiFranco's design has several disadvantages that are overcome by the present invention:

(a). The plastic clip of DiFranco's preferred embodiments can easily be over-stressed and broken, especially when used on a garment with thicker pocket rim material such as a flannel shirt or the like. In contrast, the metal compression spring used in the clip of the present invention results in a more durable, versatile product.

(b). On some eyeglass designs, the ear portion of the temple bar is much larger than the portion near the hinge. Because of this, the O-rings taught by DiFranco could easily be stretched beyond their elastic limit while being slipped over the larger ear portion, making them too large to properly fit the temple bar near the hinge, rendering the clip useless. O-rings are generally made for creating seals in compression and are not intended to be used in tension as a structural member. In contrast, an elastic band such as that used in the present invention is created for applications in which it can recover from stretching operations.

(c). Skin oil can be transferred to the temple bar in the proximity of the clip and O-rings. This oil could substantially reduce the friction that the O-rings can impart to the temple bar and may cause the clip to slide relative to the temple bar. In contrast, the attachment band of the present invention has a relatively large inside surface area away from the end openings and thereby that area is protected from such oil exposure.

Temple bar clips based on a flat spring design share common disadvantages:

(a). Being similar to a so-called bobby pin, the clip can easily snag the wearer's hair.

(b). These clips can essentially be used to store the eyeglasses in a pocket or other location with a distinct edge like a collar; not at an arbitrary location on the fabric of a garment, as allowed by the present invention.

(c). Unless an active means of securing the alternate temple bar is provided as is done in Nagel, the eyeglasses tend to unfold when the wearer bends over if the eyeglasses are stored outside of a pocket. The present invention eliminates this unfolding problem without the need of additional clamps or fasteners.

SUMMARY OF THE INVENTION

It is an object of this invention to provide an eyeglass storage clip having a spring clip to allow secure storage of eyeglasses in a pocket or anywhere on a garment with equal ease.

It is an object of this invention to provide said eyeglass storage clip with a spring clip wherein the actuating springs are totally enclosed within a cylindrical body, thereby to prevent the wearer's hair from becoming caught therein.

It is an object of this invention to provide said eyeglass storage clip having an attachment band that is easily installed on temple bars of various shapes and sizes without special skills or tools.

It is an object of this invention to provide said eyeglass storage clip having a spring clip with adequate clamping pressure to permit secure storage of eyeglasses during some physical activities.

It is an object of this invention to provide said eyeglass storage clip in a variety of colors and patterns to match or accent various eyeglass colors and patterns.

It is further an object of this invention to be easily and inexpensively manufactured from commercially available components and materials.

Further objects and advantages will become apparent from a consideration of the ensuing description and drawings.

BRIEF DESCRIPTION OF THE DRAWINGS

FIG. 1 is side view of the invention in use on a garment utilizing the forward-facing clamping jaws.

FIG. 2 is a side elevation view of the invention installed on an eyeglass temple bar.

FIG. 3 is a front elevation view of the invention in use in a shirt pocket utilizing the rearward-facing clamping jaws.

FIG. 4 is an exploded isometric view of the invention.

DETAILED DESCRIPTION OF INVENTION

Referring first to FIG. 1 a pair of eyeglasses 1 is stored on a garment 2 by means of an eyeglass storage clip of this invention. Attached to the temple bar 3 by means of an attachment band 4 is a plastic or metal spring clip 5 of the invention. A small fold of fabric 6 of the garment 2 is trapped in the forward-facing clamping jaws 7, thereby allowing for secure storage of the eyeglasses on the garment and preventing the eyeglasses from falling off, and, because of the close proximity of the forward-facing clamping jaws 7 to the temple bar hinge 8, preventing the eyeglasses from unfolding.

FIG. 2 shows a pair of eyeglasses 1 with spring clip 5 attached to temple bar 3 by means of attachment band 4 surrounding said bar. The spring clip 5 has both forward-facing clamping jaws 7 and rearward-facing clamping jaws 9 that can be opened separately by means of an actuator 10.

Referring now to FIG. 3, a pair of eyeglasses 1 is stored in shirt pocket 11 with a portion of the fabric edge of the pocket trapped in the rearward-facing clamping jaws 9, thereby providing for secure storage of the eyeglasses in the pocket and preventing them from falling out.

FIG. 4 shows an isometric exploded view of the invention. The spring clip includes a cylindrical member 12, a forward-facing shank spring 13, a forward-facing shank 14, forward-facing aperture 15, a rearward-facing shank spring 16, a rearward-facing shank 17, rearward-facing aperture 18, actuator 10, and actuator port 19.

Referring now to FIG. 1, FIG. 2 and FIG. 4, the forward-facing clamping jaws 7 are formed by the forward-facing hook-like end 20 of forward-facing shank 14, and the forward-facing rounded end 21 of cylindrical member 12. Clamping force is provided by the forward-facing shank spring 13. In a like manner the rearward-facing clamping jaws 9 are formed by the rearward-facing hook-like end 22 of rearward-facing shank 17, and the rearward-facing rounded end 23 of cylindrical member 12, wherein clamping force is provided by the rearward-facing shank spring 16.

The forward-facing clamping jaws 7 and rearward-facing clamping jaws 9 can be opened independent of one another by means of actuator 10. For example, to open forward-facing clamping jaws 7, actuator 10 is slid axially in the forward direction. This causes the forward-facing shank 14 to move axially within cylindrical body 12 and to partially protrude out of forward-facing aperture 15 thereby opening forward-facing clamping jaws 7 and permitting insertion of material of garment 2 therein.

Also shown is an attachment band 4, actuator opening 24, and inner surface 25. The spring clip 5 is secured to attachment band 4 by wrapping said attachment band around cylindrical body 12 and bonding said cylindrical body to inner surface 25 of said attachment band with actuator 10 protruding through actuator opening 24.

The attachment band 4 has a circumferential dimension large enough to permit installation of spring clip 5, and after said installation, enough material remains to form a circumferential dimension slightly smaller than that of a temple bar 3. The attachment band 4 is preferably made from an elastic material such as spandex to facilitate installation on and compatibility with temple bars of a variety of sizes and shapes. This band may be formed by wrapping a rectangular swatch of elastic fabric around an axis and attaching the wrapped ends together by bonding or sewing. Alternatively, this band may be a section cut from a continuous tube.

The invention is installed on temple bar 3 by inserting an open end of the attachment band 4 over the end of earpiece 26 and sliding band along said temple bar until in position with forward-facing clamping jaws 7 in close proximity to hinge 8. The invention is held in place on temple bar 3 by compressive radial forces generated by the elasticity of the attachment band 4 and the resulting frictional forces between said temple bar and inner surface 25.

Referring to FIG. 1 and FIG. 2, spring clip 5 is installed on a temple bar 3 with the forward-facing clamping jaws 7 facing toward temple bar hinge 8, wherein the moment arm between said jaws and said hinge is near zero. Thus, when the wearer bends forward, as one might while the eyeglasses are stored by means of the clip of this invention, the eyeglasses hang away from the surface of the garment. In this position, gravitational forces act to create a torque that tends to open the temple bar hinge 8, and, if said torque is greater than that needed to overcome friction in said hinge, the eyeglasses can unfold. By placing the forward-facing clamping jaws 7 substantially close to the temple bar hinge 8, thereby reducing the moment arm therebetween, the tendency for the hinge to open is reduced and effectively eliminated, thereby eliminating the need for additional clamps or fasteners that would be needed with prior art eyeglass storage clips.

Referring now to FIG. 2 and FIG. 3, spring clip 5 is installed on a temple bar 3. By use of rearward-facing clamping jaws 9, those clamping jaws facing toward the earpiece 26, the eyeglasses 1 can easily be stored by engaging a portion of the fabric edge of shirt pocket 11 in said rearward-facing clamping jaws.

The clamping action of both the forward-facing clamping jaws 7 and the rearward-facing clamping jaws 9 can be enhanced by molding or machining grooves 27 into the forward-facing rounded end 21 and the rearward-facing rounded end 23 of cylindrical body 12 as shown in FIG. 4.

The above disclosed invention has several particular features that are best practiced in concert although each is useful individually without departure from the scope of the invention. I have merely described preferred embodiments of the invention and it will be understood that the invention may be embodied otherwise than as herein illustrated and described.

The scope of the invention should be determined by the appended claims and their legal equivalents, rather than by the examples given.

I claim:

1. A clip for securing eyeglasses to the fabric of a garment, said eyeglasses comprising eyeglass frames attached to a temple bar by a hinge means, said clip comprising clamping jaws wherein said clip is fixedly attached to said temple bar by an attachment means and is characterized by having said clamping jaws in substantially close proximity to said hinge means, to make small the moment arm between said clamping jaws and said hinge means, upon which said moment arm forces due to acceleration act to create a torque that would tend to open said hinge means when said glasses are supported only from said clip, thus to reduce said torque below that minimum required to overcome friction in said hinge means and thereby to keep said hinge means closed.

2. The clip of claim 1 wherein said clamping jaws are spring-loaded.

3. The clip of claim 2 wherein said spring-loaded clamping jaws comprise a substantially cylindrical body having a rounded end and having axially located within it an axially movable spring-biased elongated shank that protrudes through an aperture in said rounded end and is there bent to a hook-like curvature that substantially conforms with said curvature of said rounded end thereby adapted to grip said fabric between said hook-like shank curvature and rounded end.

4. The clip of claim 3 wherein said shank is operated by an operating means that protrudes through the wall of said cylindrical body.

5. The clip of claim 3 wherein a similar shank and hook-like means protrudes from each end of said cylindrical body.

6. The clip of claim 5 wherein said opposing spring-biased shanks are separately operable by a common operating means that protrudes through the wall of said cylindrical body.

7. The clip of claim 3 wherein a spring to bias said shank is fully enclosed.

8. The clip of claim 1 wherein said attachment means is a permanent attachment.

9. The clip of claim 1 wherein said attachment means is a removable attachment.

10. The clip of claim 9 wherein said removable attachment means is an elastic band.

11. The clip of claim 10 wherein said elastic band is formed by sewing together ends of an elastic strip.

12. The clip of claim 10 wherein said elastic band is a section cut from a continuous tube.

13. A clip for securing eyeglasses to the fabric of a garment, said eyeglasses comprising eyeglass frames attached to a temple bar by a hinge, said clip comprising clamping jaws wherein said clip is fixedly attached to said temple bar by an attachment and is characterized by having said clamping jaws in substantially close proximity to said hinge to make small the moment arm between said clamping jaws and said hinge, upon which said moment arm forces due to acceleration act to create a torque that would tend to open said hinge when said glasses are supported only from said clip, thus to reduce said torque below that minimum required to overcome friction in said hinge and thereby to keep said hinge closed.

14. The clip of claim 13 wherein said clamping jaws are spring-loaded.

15. The clip of claim 14 wherein said clamping jaws comprise a substantially cylindrical body having a rounded end and having axially located within it an axially movable spring-biased elongated shank that protrudes through an aperture in said rounded end and is there bent to a hook-like curvature that substantially conforms with said curvature of said rounded end thereby adapted to grip said fabric between said hook-like shank curvature and rounded end.

16. The clip of claim 15 wherein said shank is operated by an actuator that protrudes through the wall of said cylindrical body.

17. The clip of claim 15 wherein a similar shank and hook-like portion thereof protrudes from each end of said cylindrical body.

18. The clip of claim 17 wherein said opposing spring-biased shanks are separately operable by a common actuator that protrudes through the wall of said cylindrical body.

19. The clip of claim 15 wherein a spring to bias said shank is fully enclosed.

20. The clip of claim 13 wherein said attachment is a permanent attachment.

21. The clip of claim 13 wherein said attachment is a removable attachment.

22. The clip of claim 21 wherein said removable attachment is an elastic band.

23. The clip of claim 22 wherein said elastic band is formed by sewing together ends of an elastic strip.

24. The clip of claim 22 wherein said elastic band is a section cut from a continuous tube.

* * * * *